United States Patent [19]

Varady

[11] 4,310,173

[45] Jan. 12, 1982

[54] HYDRAULIC-ACTUATING DEVICE FOR MOTOR VEHICLES

[76] Inventor: Theodore F. Varady, 20938 S. Denker St., Torrance, Calif. 90501

[21] Appl. No.: 138,353

[22] Filed: Apr. 8, 1980

[51] Int. Cl.³ .......................................... B60G 11/14
[52] U.S. Cl. ................................. 280/704; 280/6 H; 180/313
[58] Field of Search ............... 180/313; 280/704, 707, 280/703, 714, DIG. 1, 1, 6 H; 188/321; 46/248

[56] References Cited

U.S. PATENT DOCUMENTS

| | | | |
|---|---|---|---|
| 1,577,743 | 3/1926 | Gossett | 180/313 |
| 1,682,764 | 9/1928 | Mohr | 180/313 |
| 1,973,706 | 9/1934 | Hawley | 188/321 |
| 2,919,930 | 1/1960 | Cislo | 280/714 |
| 2,923,557 | 2/1960 | Schilling et al. | 280/DIG. 1 |
| 3,123,349 | 3/1964 | Cislo | 280/DIG. 1 |
| 3,195,877 | 7/1965 | Cislo | 280/DIG. 1 |
| 4,143,729 | 3/1979 | West et al. | 188/321 |
| 4,238,128 | 12/1980 | McKee | 280/703 |

FOREIGN PATENT DOCUMENTS 817668  8/1959  United Kingdom ............... 188/321

Primary Examiner—Tim R. Miles
Attorney, Agent, or Firm—Francis X. LoJacono

[57] ABSTRACT

A hydraulic-actuating device for use in motor vehicles, whereby hydraulic actuators are positioned to replace conventional shock absorbers, the actuators being mounted between the frame structure of the vehicle and its associated wheel-suspension unit, wherein each hydraulic actuator includes a support or guide plate and a coil spring. The actuator is arranged to be movably engaged with the vehicle frame structure by means of the coil spring member which is supported by the lower arm member of the vehicle-suspension unit of each wheel, the guide plate being interposed between the spring member and the rod of the actuator.

7 Claims, 7 Drawing Figures

U.S. Patent   Jan. 12, 1982   4,310,173
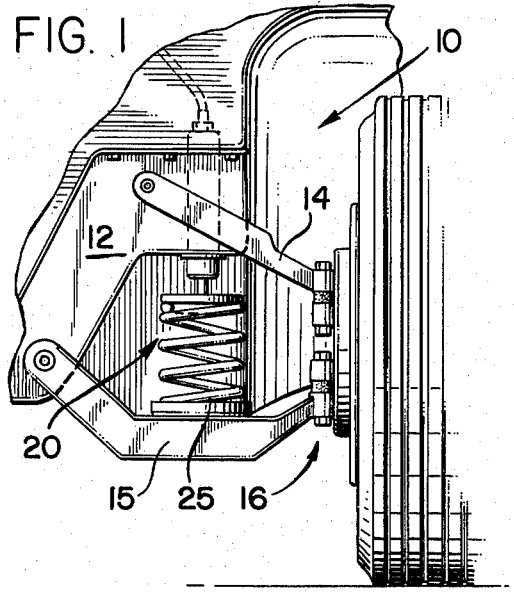
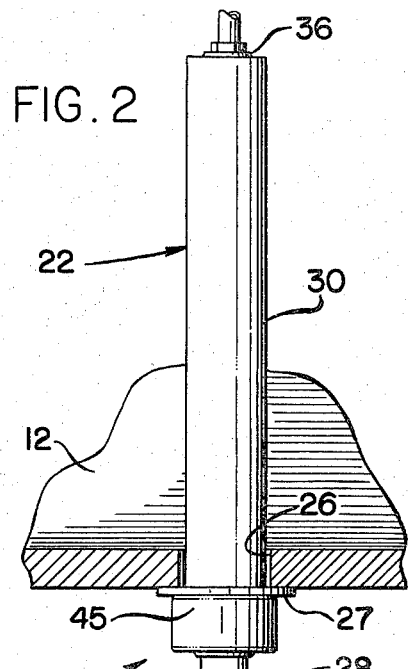
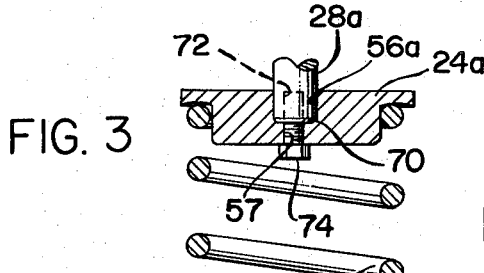
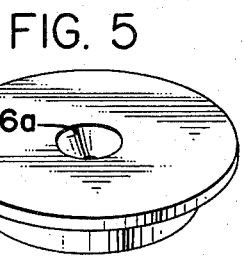
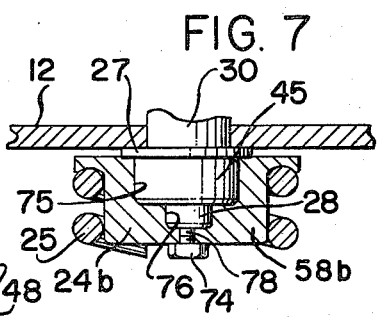
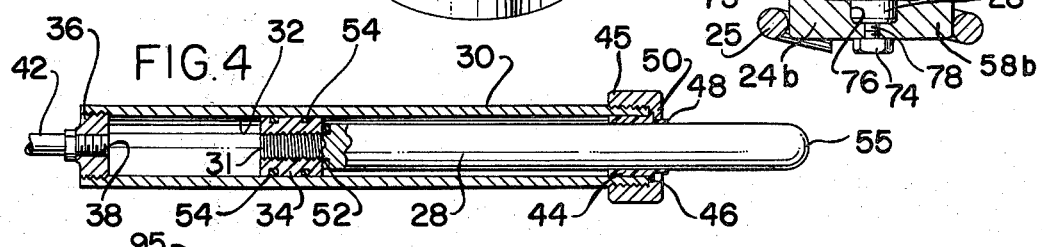
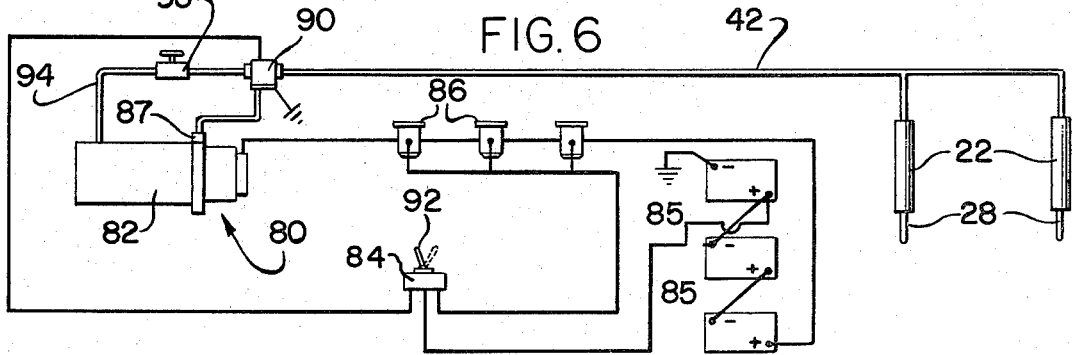

HYDRAULIC-ACTUATING DEVICE FOR MOTOR VEHICLES

BACKGROUND OF THE INVENTION

1. Field of the Invention

This invention relates generally to hydraulic actuators, and more particularly to a hydraulic-actuator device that is interposed between a vehicle frame structure and its associated suspension system, so that when it is actuated in a consecutive manner it will cause the vehicle to lift off the ground surface in a bucking or leaping manner.

2. Description of the Prior Art

There are numerous types of hydraulic-actuator devices and systems, but none are known to be directed to use as a means to cause a vehicle to buck or leap so that the front or rear end of the vehicle will actually leave the ground surface. This type of action is being employed by vehicle owners as a sport wherein the vehicle driver attempts to cause his vehicle to jump off the ground surface as high as he can. Presently, this is rapidly becoming established as a highly competitive sport.

Various hydraulic devices are being employed to create a bucking or leaping action. These devices are generally interposed between the vehicle frame structure and its related suspension system, both in the front and the rear of the vehicle.

SUMMARY AND OBJECTS OF THE INVENTION

In accordance with the invention claimed, a new and improved hydraulic-actuator device is provided which can cause a vehicle, such as a passenger car or the like, to jump or leap from its front or rear end separately or together, whereby the vehicle and the wheels thereof will leave the ground surface.

Thus, it is an important object of the present invention to provide a hydraulic device that will allow a vehicle to be raised or lifted high off the ground surface by providing a hydraulic actuator that is movably mounted or supported between the frame structure of a vehicle and its related suspension system, the device including an intermediate support plate and a coil spring.

Another object of this invention is to provide an improved device for this purpose that is actuated by its own hydraulic system which comprises at least one hydraulic-pump unit that includes its own electrical-supply system.

A further object of this invention is to provide an improved hydraulic-actuating device wherein the actuator, the support plate and the coil are interengaged with each other and are freely engaged between the vehicle frame and the suspension system thereof, thus eliminating any binding or restriction between the movement of the hydraulic members and the vehicle frame and suspension system, whereby greater reactional force is established therebetween.

A still further object of the invention is to provide a device of this character wherein the support plate can either be freely engaged with the rod of the actuator or affixed thereto.

It is still another object of this invention to provide a device of this character that is easy to install, service and maintain.

Still another object of the invention is to provide a device of this type that is relatively inexpensive to manufacture.

The characteristics and advantages of the invention are further sufficiently referred to in connection with the accompanying drawings, which represent one embodiment. After considering this example, skilled persons will understand that variations may be made without departing from the principles disclosed; and I contemplate the employment of any structures, arrangements or modes of operation that are properly within the scope of the appended claims.

BRIEF DESCRIPTION OF THE DRAWINGS

Referring more particularly to the accompanying drawings, which are for illustrative purposes only:

FIG. 1 is an elevational view of a typical front suspension system of a vehicle, illustrating the arrangement thereon of the present invention;

FIG. 2 is an enlarged view of the hydraulic actuator mounted within a portion of the vehicle frame structure, along with the support plate and a portion of the coil spring;

FIG. 3 is a cross-sectional view of an alternative arrangement of the mounting of the support plate to the end of the hydraulic-rod member;

FIG. 4 is a longitudinal cross-sectional view of the actuator member;

FIG. 5 is a perspective view of the intermediate support plate;

FIG. 6 is a schematic view of a typical electrical hydraulic system used to activate the present invention; and FIG. 7 illustrates another arrangement of a support plate.

DESCRIPTION OF THE PREFERRED EMBODIMENT

Referring more particularly to FIG. 1, there is shown a front-wheel-suspension system of a vehicle, generally indicated at 10, having a frame structure 12 to which suspension arms 14 and 15 are separately connected. Accordingly, arms 14 and 15 extend outwardly to support and control the wheel assembly, indicated generally at 16. Normally, a shock-absorber device is interposed between the frame structure 12 and the suspension arm or arms.

However, FIG. 1 further illustrates the placement of the present invention which is defined by a hydraulic-actuating device, designated generally at 20. This device comprises a hydraulic actuator 22, an intermediate support plate 24, and a coil spring 25, all of which are interposed between frame 12 and suspension arm 15.

It should be understood that the actuator assembly is not fixed to any part of the body or frame of the vehicle, nor to any part of the suspension system. That is, actuator 22 is received in an opening 26 of frame member 12 and is restricted from any upward movement by washer means 27, as seen in FIG. 2. The intermediate support plate 24 is positioned between the hydraulic-actuator rod 28 and coil spring 25, spring 25 being supported by arm 15. Thus, the biasing force of spring 25 secures the hydraulic assembly in its operative position.

Hydraulic actuator 22 comprises a cylindrical body 30 having a typical elongated chamber 32 in which a piston head 34 and its associated rod 28 are slidably mounted. The cylindrical body 30 is closed at one end by cap member 36 which is provided with a threaded bore 38 to accept a typical threaded insert 40 of pipe or conduit 42. The opposite end of body 30 is provided with a nylon bushing 44 which is held in place by a second end cap member 45. The nylon bushing includes an annular flange 46 and extending lip member 48. The flange 46 is adapted to be positioned between the annular end of body 30 and the inner surface or shoulder 50 of cap 45. The nylon bushing allows for the free linear movement of rod 28, without causing lateral vibrating forces. Rod 28 is threaded at its inner end 31 to piston head 34, the head and rod being sealed therebetween by an "O"-ring member 52. This prevents leakage of fluid which would generally occur during the rapid high-pressure reciprocal operation of piston rod 28. Head 34 further includes sealing means 54.

Rod 28 is provided with a rounded free end 55 which is adapted to be received in the central cavity 56 of plate 24, as seen in FIG. 2. Plate 24 comprises a main body 58 and an annular flange 60, forming a support shoulder for coil spring 25. Cavity 56 in plate 24 is formed having a concaved bottom wall 62 and an inclined annular wall 64, thus allowing the round convex end 55 of rod 28 to be freely engaged therein and further allowing plate 24 to move angularly under various reacting forces.

In FIG. 3, there is an alternative arrangement of the free end of rod 28a wherein it terminates in a flat beveled edge 70, and includes a threaded bore 72 that is adapted to receive a bolt 74. Support plate 24a includes a central cavity 56a having a reduced bore 57 to receive bolt 74 therethrough, whereby—in this arrangement—plate 24a is affixed to rod 28a. When this arrangement of the support plate or platform 24a is employed, the rocking movement is transmitted into spring 25.

Another arrangement of a support plate or platform 24b is illustrated in FIG. 7, wherein the body 58b is made thicker than the other disclosed body members. This allows the plate to be provided with a first large cavity 75 in which end cap 45 is adapted to be received, when the frame 12 is lowered to its extreme position. Thus, bore 76 is counter-sunk to receive the end of rod 28. A smaller bore 78 is provided to receive bolt 74, thereby securing plate 24b to piston rod 28.

FIG. 6 illustrates a typical hydraulic and electrical diagram of the system, wherein as an example a pair of hydraulic actuator cylinders are connected to a suitable pump means 80 through conduit line 42. The pump means 80 is provided with a reservoir 82, whereby hydraulic fluid is pumped through line 42, thus applying pressure to each piston rod 28. Pump 80 is activated by switch 84 which—through batteries 85—energizes relay means 86, one relay being generally supplied for each 12-volt battery. Thus, fluid passes through check valve 87 to a suitable three-way solenoid valve 90. At this time, fluid can flow only into actuators 22. When switch 84 is moved to position 92, the 24-volt solenoid valve 90 is opened—thus allowing the hydraulic fluid to return to reservoir 82 through conduit 94 and needle valve 95. Valve 95 slows the return of fluid, and thus controls the retraction of piston rods 28.

Thus, by selectively activating switch 84, a vehicle can be caused to buck and bounce, whereby the front and/or rear ends of the vehicle can be forced to leave the surface of the ground to varying heights. This activity is at present rapidly becoming a competitive sport.

The invention and its attendant advantages will be understood from the foregoing description; and it will be apparent that various changes may be made in the form, construction and arrangement of the parts of the invention without departing from the spirit and scope thereof or sacrificing its material advantages, the arrangement hereinbefore described being merely by way of example; and I do not wish to be restricted to the specific form shown or uses mentioned, except as defined in the accompanying claims.

I claim:

1. A hydraulic-actuating device for use in the front and/or rear ends of vehicles, to cause said vehicles to bounce off the ground surface when selectively actuated through a combination hydraulic and electrical system, wherein the device comprises:
   a hydraulic cylinder wherein one end is adapted to receive hydraulic fluid, said cylinder being mounted for movable engagement with the vehicle frame member;
   a piston head slidably disposed within said cylinder;
   a piston rod connected to said piston head, and extending from one end of said cylinder;
   a cap member mounted to said cylinder to seal and restrain said piston head in said cylinder;
   a bushing member secured between said cap member and said cylinder end;
   a restraining means interposed between said cap member and said vehicle frame member, thereby restraining the movement of said cylinder in one direction;
   a support-plate member adapted to engage said piston rod; and
   a coil-spring member interposed between said plate member and the suspension assembly of said vehicle.

2. A hydraulic-actuating device as recited in claim 1, wherein said plate member comprises a main body member having a central cavity formed therein to receive the end of said rod, said body having an annular flange defining an annular shoulder to engage said coil spring.

3. A hydraulic-actuating device as recited in claim 2, wherein said end of said rod is formed having a rounded head, and wherein said cavity of said plate includes a concave surface to receive said rounded head.

4. A hydraulic-actuating device as recited in claim 2, wherein said end of said rod is formed having a threaded bore, and wherein said plate includes a reduced-diameter bore to receive a bolt therethrough to engage said threaded bore of said rod.

5. A hydraulic-actuating device as recited in claim 4, wherein said plate includes an enlarged cavity adapted to receive said cap member of said cylinder.

6. A hydraulic-actuating device as recited in claim 2, wherein a sealing means is interposed between said piston head and said piston rod.

7. A hydraulic-actuating device as recited in claim 3, wherein said central cavity includes an annular inclined wall to allow movement between said rod and said plate.

* * * * *